United States Patent [19]

Gayman et al.

[11] 3,866,181

[45] Feb. 11, 1975

[54] INTERRUPT SEQUENCING CONTROL APPARATUS

[75] Inventors: Byron G. Gayman, Holliston, Mass.; Russell A. Henzel, Doylestown, Pa.

[73] Assignee: Honeywell Information Systems Inc., Waltham, Mass.

[22] Filed: Dec. 26, 1972

[21] Appl. No.: 318,138

[52] U.S. Cl. .................... 340/172.5

[51] Int. Cl. .................... G06f 9/18

[58] Field of Search .................... 340/172.5

[56] References Cited

UNITED STATES PATENTS

| | | | |
|---|---|---|---|
| 3,359,544 | 12/1967 | Macon et al. | 340/172.5 |
| 3,453,600 | 7/1969 | Stafford et al. | 340/172.5 |
| 3,508,206 | 4/1970 | Norberg | 340/172.5 |
| 3,576,542 | 3/1971 | Floyd | 340/172.5 |
| 3,665,415 | 5/1972 | Beard et al. | 340/172.5 |
| 3,665,415 | 5/1972 | Beard et al. | 340/172.5 |
| 3,716,837 | 2/1973 | Waddell | 340/172.5 |
| 3,742,148 | 6/1973 | Ledeen et al. | 340/172.5 |

*Primary Examiner*—Gareth D. Shaw
*Assistant Examiner*—Paul R. Woods
*Attorney, Agent, or Firm*—John S. Solakian; Ronald T. Reiling

[57] ABSTRACT

A plurality of devices such as a disc storage device or printer for example are coupled over a common bus in a priority arrangement for providing interrupt servicing with a data processor. Each device may be in a state in which it either has (1) no present need for interrupt servicing, called the inactive state, or (2) a present need for interrupt servicing which need has not been acknowledged by the processor, called the wait state, or which need has been acknowledged by the processor, called the request state, or (3) it is presently enabled interrupt servicing with the processor, called the active state. Control means are shown which in combination with signals from the processor enable one or more of the devices to be in either state. The control means is coupled to respond in an improved manner to the state required and for example allows an active device to remain suspended in the active state while a device which has just gone to the active state is serviced, after which the suspended active state device is again serviced. The control means further includes means for changing the highest priority active device to its inactive state upon completion of its interrupt servicing without changing the state of any other devices.

11 Claims, 3 Drawing Figures

| SEQUENCE | DEVICE 14-1 | DEVICE 14-2 | DEVICE 14-N |
|---|---|---|---|
| 1 | I | I | I |
| 2 | I | W | W |
| 3 | I | R | R |
| 4 | I | A | R |
| 5 | W | A | R |
| 6 | R | A | R |
| 7 | A | A | R |
| 8 | I | A | R |
| 9 | I | I | R |
| 10 | I | I | A |
| 11 | I | I | I |

Fig. 2.

| SIGNAL | FF30 | FF32 | FF34 | STATE |
|---|---|---|---|---|
| | 0 | 0 | 0 | INACTIVE |
| DEVICE READY | | | | |
| | 1 | 0 | 0 | WAIT |
| REQUEST ENABLE | | | | |
| | 1 | 1 | 0 | REQUEST |
| ACEN | | | | |
| | 0 | 0 | 1 | ACTIVE |
| HP-CAI-STROBE | | | | |
| | 0 | 0 | 0 | INACTIVE |

Fig. 3.

INTERRUPT SEQUENCING CONTROL APPARATUS

BACKGROUND OF THE INVENTION

The apparatus of the present invention generally relates to data processing systems and more particularly to interrupt control apparatus associated with devices coupled with a data processor in the system.

In a system having a plurality of devices coupled with a data processor over a common bus, an orderly system must be provided which allows each of such devices on a priority basis to interrupt and cause a transfer of control within the processor. Each device must be allowed to progress through various interrupt requesting states on an orderly basis, yet the higher priority devices must be allowed to intervene and take priority should it be required. Any such intervention by a higher priority device must not be allowed to change the state of the other devices, that is, a device should not be required to make a further request in order to attain its requesting state prior to the intervention. Such a lower priority device should be allowed to suspend in its current requesting state until it is again the highest priority requesting device. Further, to accomplish this orderly system, the interrupt sequencing control apparatus should be fast in response, yet simple in construction.

It is accordingly a primary object of the invention to provide improved interrupt sequencing control apparatus which enables an orderly and fast response to an interrupt request from any one of a plurality of devices coupled with a data processor over a common bus.

SUMMARY OF THE INVENTION

The above and other objects of the invention are attained by providing interrupt sequencing apparatus coupled in a system having a data processor connected to transfer data and control information with any one of a plurality of devices, the devices being connected in an interrupt priority arrangement. The interrupt sequencing apparatus comprises means included in each of the devices for generating an interrupt signal indicating that the respective device is ready to cause a transfer of control within the data processor. The data processor includes means responsive to the interrupt signal of the highest priority device for enabling the transfer of control within the processor in accordance with the identity of the highest priority device which has generated the interrupt signal. The devices further include means for storing the interrupt signals generated both before and after the means for enabling responds to the interrupt signal from the highest priority device and further means are provided which means are responsive to the completion of the transfer of control within the processor and the highest priority device generating the interrupt signal for enabling the highest priority device which has stored an interrupt signal. Further means are provided for suspending the response of processor to the device which is currently being serviced when an interrupt signal is generated by a device having yet a higher priority than the device currently being serviced. Further means are included for automatically enabling the resumption of the response of the processor to the device whose servicing has been suspended upon the completion of the servicing of the device having the higher priority.

BRIEF DESCRIPTION OF THE DRAWINGS

The manner in which the apparatus of the present invention is constructed and its mode of operation will best be understood in the light of the following detailed description, together with the accompanying drawings in which:

FIG. 2 is a state diagram illustrating the operation of the apparatus of the invention; and FIG. 3 is a state diagram indicating the detailed operation of a portion of the apparatus shown in FIG. 1.

DETAILED DESCRIPTION OF THE PREFERRED EMBODIMENT

Figure 1:
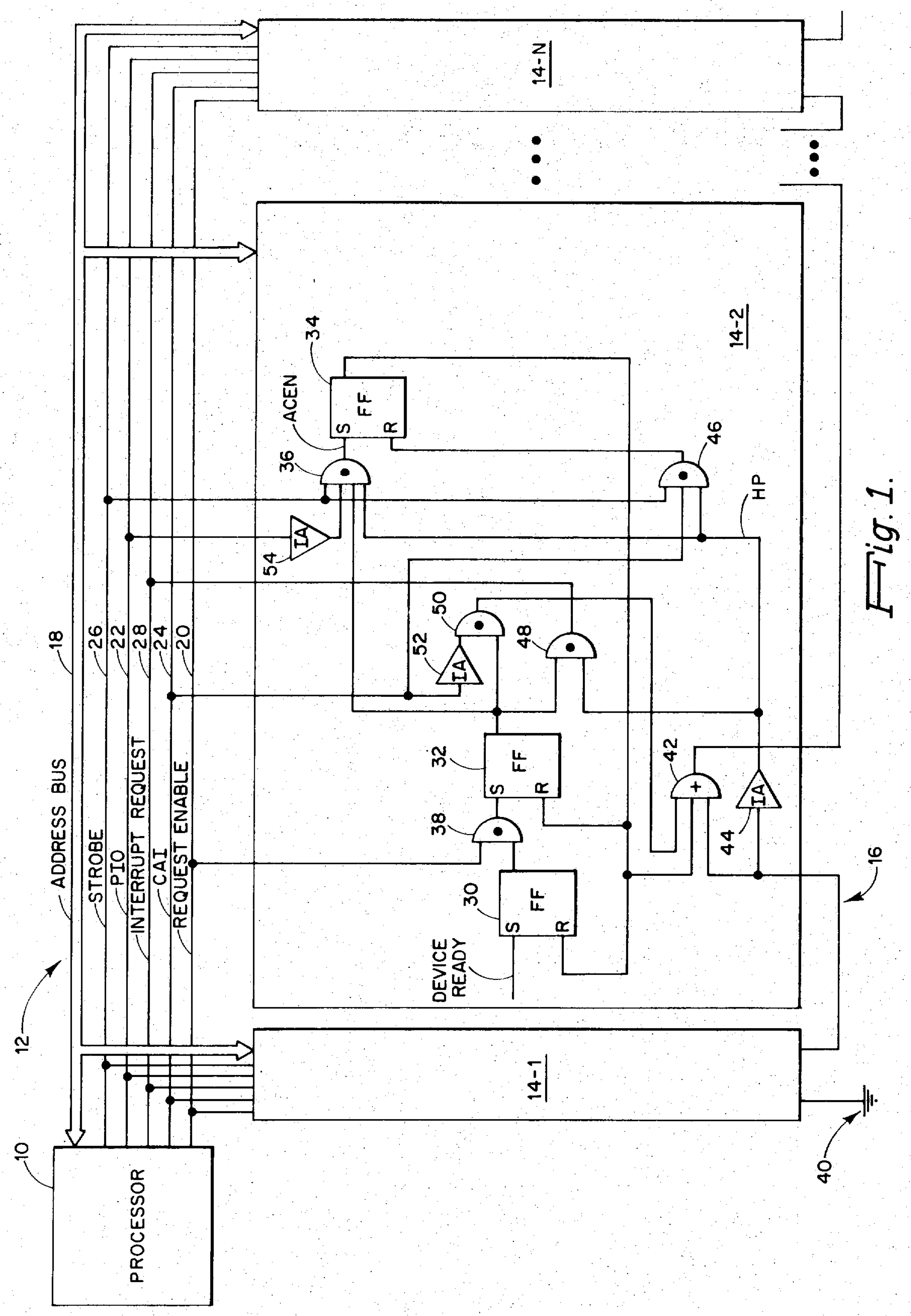
FIG. 1 is a block diagram of the apparatus of the invention.

In FIG. 1 there is shown a processor 10 coupled over a common electrical bus 12 with a plurality of devices 14-1 to 14-N. The devices 14 are also coupled over a priority network 16. The logic shown in device 14-2 is that logic which is typical for each of the other devices 14. The processor 10 may be any processor which is generally capable of operating on data whereas devices 14 may be for example a disc storage device, a tape storage device, a printer, terminal, or any other device which requires the transfer of data with another device such as a processor. The common electrical bus 12 includes an address bus 18 which includes one or more wires. The bus 12 also includes a Request Enable line 20 which provides a Request Enable signal from processor 10 in order to enable any one of the devices which are ready to request an interrupt. Processor 10 also issues the PIO signal on line 22. The PIO signal is the programmed input/output signal signifying that there is currently data being transferred under direct program control between the processor 10 and one of the devices 14. Also provided by processor 10 is the CAI signal which is the Clear Active Interrupt signal generated by the processor when the highest priority device which is being serviced, has had such service completed. Processor 10 also issues a Strobe signal on line 26 either in response to the Interrupt Request signal on line 28 or upon the generation of the CAI signal on line 24 upon generation of the PIO signal which occurs simultaneously with the CAI signal. A device generates the Interrupt Request signal on line 28 if the device is the highest priority device which is ready to request a transfer of control by processor 10.

Each of the devices 14 may be in any one of four states. The four states are the Inactive, Wait, Request, and Active states. The Inactive state of the device is defined to be that state in which the device is not ready to cause an interrupt. The Wait state is that state which occurs after the device indicates that it is ready to cause an interrupt. The Wait state terminates after the processor 10 is ready to allow another device to cause an interrupt which readiness of the processor 10 is indicated by the presence of the Request Enable signal on line 20. The Request state occurs between the time the Request Enable signal is generated and the time the Strobe signal is generated on line 26 if there is not a programmed input/output operation as indicated by the PIO signal on line 22 and if the particular device is the highest priority requesting device. The Active state occurs between the time that the Strobe signal is generated on line 26 in response to the Interrupt Request signal and the time that the CAI signal is generated on line 24 indicating that the servicing of the just active device has been completed, and in addition upon the generation of the Strobe signal in response to the CAI signal.

The typical logic as shown for device 14-2 includes three flip-flops, 30, 32 and 34 whose outputs signify the respective states. If none of the flip-flops 30, 32 and 34 are set, the device is in the Inactive state, whereas if only flip-flop 30 is set, the device is said to be in the Wait state. Flip-flop 30 is set by a Device Ready signal generated internally by the device signifying that the device is ready to cause an interrupt. An example of a peripheral device providing a device ready signal may be found in U.S. Pat No. 3,380,031, issued Apr. 23, 1968 particularly with respect to the logic associated with element 6 of FIGS. 3 and 5. Another example of a peripheral device capable of providing a device ready signal may be found in the book entitled, "Peripheral Devices," by Ivan Flores, Prentice-Hall Inc. 1973 and more particularly at page 259 with reference to FIG. 8.2.4. It should be further understood that in fact the device ready signal may be provided in its most elemental state by means of the closure of a simple toggle switch coupled on the input side to a voltage source and on the other with the set input of flip-flop 30. If both flip-flops 30 and 32 are set and flip-flop 34 remains reset, then the device is said to be in the Request state. Flip-flop 32 is set in response to the setting of flip-flop 30 and the presence of the normally present Request Enable signal on line 20 which thereby enables AND gate 38 setting flip-flop 32. The Active state is indicated when flip-flop 34 is set, which condition thereby resets flip-flops 30 and 32. The flop-flop 34 is set in response to the ACEN signal which is a combination of the presence of four signals enabling AND gate 36, as will be hereinafter discussed. Flip-flop 34 is reset thereby placing the device in the Inactive state in response to the highest priority indication signal HP, the generation of the CAI signal and the generation of the strobe signal in response to the CAI signal. FIG. 3 illustrates the various states of the flip-flops 30, 32, and 34 and the signals which are required to transfer from one state to another.

The priority network 16 is shown coupled between the various devices. The break in the priority network 16 between device 14-2 and 14-N indicates that there may be other devices connected in the system. If device 14-N is actually the next device after 14-2 then the unconnected lines of network 16 as shown would be connected. Priority network 16 is coupled to receive a ground signal as shown by symbol 40. If the device is the highest priority device, then the ground signal will be received at its OR gate 42 and inverting amplifier 44. If the ground signal is designated as the False state, then the inverting amplifier 44 will produce a True state which will partially enable AND gates 46, 48, and 36. The False state coupled to one input of OR gate 42 will be transferred to the output of OR gate 42 if the other two inputs of OR gate 42 are also in the False state. Thus, if all three inputs to OR gate 42 are in the False state, the False state will be transferred to the next device signifying that the next device may be the highest priority device. The priority network 16 is shown by way of example and it should be understood that other priority networks may be utilized in the sytem. For example, the priority network shown in application Ser. No. 266,768, filed June 27, 1972 may be utilized.

The operation of the typical logic shown for device 14-2 shall now be discussed. At any time, the Device Ready signal may set flip-flop 30 thus transferring the device from the Inactive state to the Wait state. When the Request Enable signal is inhibited by processor 10 thereby indicating that the processor is not able to provide interrupt servicing for any other devices, AND gate 38 is inhibited thereby preventing the device from going to the Request state. If device 14-2 is the highest priority device, that is, if a False state is received at the input of inverting amplifier 44, a True state will be produced at the output of amplifier 44 thereby fully enabling AND gate 48 (but only after gate 38 has been fully enabled to set flip-flop 32) and placing the Interrupt Request signal on line 28. AND gate 50 will also be enabled since the CAI signal is not present and accordingly the output of inverting amplifier 52 is in the True state. The enabled gate 50 provides a signal at its output which is in the True state and accordingly the True state provided via AND gate 50 is transferred via OR gate 42 so that the next device will known that there is a higher priority device which is causing an interrupt in the sytem. It will be noted that only the highest priority device in the Request state generates an interrupt request signal to the processor 10. The processor 10 will know the identity of the device generating the Interrupt Request signal on line 28 via the device address supplied on bus 18 in response to the interrupt request signal condition. Such an embodiment is shown in U.S. Pat. No. 3,800,287, issued Mar. 26, 1974.

In response to the Interrupt Request signal on line 28, the processor 10 issues a Strobe signal on line 26 which fully enables AND gate 36. AND gate 36 is enabled at its other inputs if a programmed input/output operation is absent thereby generating a True state at the output of inverting amplifier 54, when the flip-flop 32 is set and when the device is the highest priority device as indicated by the True state of the HP signal. Accordingly, with AND gate 48 fully enabled, the ACEN signal is generated thereby setting flip-flop 34. The device 14-2 is now in the Active state and the True state of the output of flip-flop 34 resets flip-flops 30 and 32. The ACEN signal indicates that the device address may be placed on address bus 18. With flip-flop 34 now having been set, the True state remains at the output of OR gate 42 even though flip-flop 32 has been reset thereby disabling AND gate 50. Accordingly, other lower priority devices remain inhibited from gaining access for interrupt service.

Upon the completion of the interrupt service by processor 10 for device 14-2, the processor generates the CAI signal on line 24, thereby maintaining the disablement of AND gate 50 via inverting amplifier 52, and also partially enabling AND gate 46. If the device is the highest priority device the True state of the HP signal is generated and upon the generation of the Strobe signal which Strobe signal is generated automatically during the CAI signal, AND gate 46 is fully enabled. Accordingly, with AND gate 46 fully enabled, flip-flop 34 is reset and the interrupt service is inhibited and further the state provided at the output of OR gate 42 is now the False state thereby allowing a lower priority device to gain access for interrupt service unless a higher priority device such as device 14-1 has generated its Device Ready signal. It can be seen that the generation of the CAI and Strobe signals upon completion of the interrupt service for a particular device does not change the state of any other device except a device which has the highest priority and which has been just serviced by the processor 10. This is accomplished via the enabling of gate 46 in our example in device 14-2 only, since gate 46 of any other device would not have received the True state of the HP signal.

It can further be seen that any device may go to the Wait state and then the Request state upon the generation of the Request Enable signal and that a higher priority device may go to the Active state even though a lower priority device is presently in the Active state. It can be seen that if a higher priority device 14-1 requires interrupt service, then the HP signal in device 14-2 will go to the False state. However, it can be seen that flip-flop 34 remains set and accordingly the lower priority device, now device 14-2, remains in the Active state and upon the completion of the interrupt service for device 14-1 and accordingly the resetting of flip-flop 34 in device 14-1, device 14-2 will again be the highest priority device and the True state of the HP signal in device 14-2 will automatically reenable the interrupt service for device 14-2 by the processor 10. It can be seen that from the simplified logic shown, that each device may be provided with indications of the various states, for example lights coupled to be driven via the setting of the various flip-flops. It also can be seen that various modifications may be made without departing from the scope of the invention. For example, although the system is shown with simple AND and OR gates, other such devices such as NAND gates and NOR gates may be employed. Also the priority network 16 may be arranged in a different manner so long as each device has a particular priority.

To further explain the operation of the apparatus of the present invention reference is now made to FIG. 2 which illustrates a state diagram of the various possible states of the devices 14-1, 14-2, and 14-N assuming that the devices between device 14-2 and 14-N are always in the Inactive state. The various states are shown in their sequence by way of example and the various states are indicated by the first letter of the particular state's name. For example, the Inactive state is represented by the letter I. Accordingly, assuming initially that all devices are in the Inactive state, at sequence two, both devices 14-2 and 14-N generate Device Ready signals and go to the Wait state. At sequence three, and after the Request Enable signal is generated by processor 10, both devices 14-2 and 14-N go to the Request state. Device 14-1 remains in the Inactive state since it is not ready for interrupt service. Since device 14-2 is the highest priority requesting device, it generates an Interrupt Request signal on line 28 to processor 10 which is acknowledged by the Strobe signal on line 26 and thereby, if there is not a programmed input/output operation in effect, causes device 14-2 to go to the Active state. Device 14-N remains in the Request state whereas device 14-1 is in the Inactive state. By way of example, if after device 14-2 goes to the Active state and is still being serviced, and if device 14-1 now generates its Device Ready signal, then device 14-1 goes to the Wait state and after the Request Enable signal is generated, device 14-1 goes to the Request state. As device 14-1 changes its state, device 14-2 does not change the status of its flip-flops 30 and 32 because the Device Ready signal is not presently generated in device 14-2. Since the device 14-1 is now in the Request state and since gate 50 in device 14-1 has generated the True state at the input to inverting amplifier 44 and OR gate 42 of device 14-2, device 14-2 is no longer serviced by processor 10 although device 14-2 remains in the Active state. Device 14-2 remains in the Active state but is not serviced. It simply takes longer in this case to service device 14-2. Once device 14-1 has been serviced, it then goes to the Inactive state upon the generation of the CAI and Strobe signals. Accordingly, the change in device 14-1 from the Inactive to the Wait to the Request to the Active states and then to the Inactive state occurs during sequence numbers 4, 5, 6 and 7 respectively and it can be seen that device 14-2 remains in the Active state during that time. Device 14-N remains in the Request state during that time. Finally, during sequence 8 device 14-2 has its servicing completed and at sequence 9, device 14-2 also goes to the Inactive state as did device 14-1. Device 14-N remains in the Request state during sequence 9 and device 14-2 goes to the Inactive state. During sequence 10, device 14-N goes from the Request state to the Active state and after the interrupt service, during sequence 11 goes to the Inactive state and accordingly all devices 14-1, 14-2, and 14-N are in the Inactive state.

Having described the invention, what is claimed as new and novel and for which it is desired to secure Letters Patent is:

1. Interrupt sequencing apparatus coupled in a system having a data processor connected to provide interrupt service in response to an interrupt signal from any one of a plurality of devices, said devices connected in an interrupt priority arrangement, said apparatus comprising:

A. means, included in each of said devices, for generating said interrupt signal indicating that said respective device is ready to request interrupt service from said processor;

B. interrupt priority means, coupled with each of said devices, for enabling the interrupt signal from the highest priority device;

C. means, responsive to the enabled interrupt signal from the highest priority device of said devices, for receiving an indication of the commencement of interrupt service for the highest priority device generating said interrupt signal;

D. means, included in each of said devices, for storing said interrupt signals generated either before or after said means for receiving provides the indication of the commencement of said interrupt service; and E. means, responsive to the completion of the interrupt service of said highest priority device generating said interrupt signal, for enabling the highest priority device which has stored an interrupt signal to request interrupt service from said processor.

2. Apparatus as in claim 1 further comprising:

A. means for suspending the interrupt service with the one of said devices which is currently being serviced when said interrupt signal is generated by a device having a higher priority than said device currently being serviced by said processor; and B. means for automatically enabling the resumption of the interrupt service for said device whose interrupt service has been suspended upon the completion of the interrupt service by said processor for said device having said higher priority.

3. Apparatus as in claim 2 further comprising means for changing the state of said higher priority device to a state which indicates that said higher priority device is not ready for interrupt service by said processor, said means for changing responsive to the completion of interrupt service of said higher priority device and said means for changing not affecting the state of any other device.

4. Apparatus as in claim 3 wherein any one of said devices is capable of any one of four states including inactive, active, request and active states, said states indicated or generated in response to the following means, including:

A. first means, including said means for changing, for placing any one of said devices in the inactive state when the device is not ready for interrupt service by said processor;

B. second means, responsive to the readiness of the respective device for interrupt service by said processor, for placing said respective device in the wait state;

C. third means, responsive to the readiness of the respective device for interrupt service and a signal indicating that said processor will service an interrupt request, for placing the respective device in the request state; and D. fourth means, responsive to the respective device in the request state and to a signal indicating that said respective device is the highest priority device, for placing said device in the active state thereby enabling interrupt service of said respective device by said processor.

5. Apparatus as in claim 4 wherein said interrupt priority means for each of said devices includes:

A. means for receiving a priority indication signal from another device;

B. means for inhibiting said device if said priority indication signal indicates that another device is the highest priority device which is ready for interrupt service; and C. means for enabling said device to be serviced if said priority indication signal indicates that there are no other higher priority devices which are ready to be serviced.

6. Apparatus as in claim 5:

A. wherein said second means for placing includes a first bistable storage means having an output coupled for indicating that said respective device is in the wait state;

B. wherein said third means for placing includes a second bistable storage means having an output coupled for indicating that said respective device is in the request state; and C. wherein said fourth means for placing includes a third bistable storage means having an output for indicating that said respective device is in the active state.

7. Apparatus in claim 6 wherein said means for generating said interrupt signal includes gate means enabled in respnse to the indication of said request state from the output of said second bistable storage means and to said signal indicating that said respective device is the highest priority device which is ready for service.

8. Interrupt sequencing apparatus coupled in a system having a data processor connected to provide interrupt service with any one of a plurality of devices, said devices connected in an interrupt priority arrangement, said apparatus included in each of said devices, said system comprising:

A. bus means for coupling said devices in accordance with their respective interrupt priorities; said apparatus comprising B. means for receiving a device ready signal, said signal indicating that the respective device is ready to transfer data;

C. first bistable means, responsive to said device ready signal, for generating a signal indicating that said respective device is in a wait state;

D. second bistable means, responsive to the simultaneous presence of both said signal indicating that said respective device is in said wait state and a signal indicating that said processor will allow the interrupt servicing, for generating a signal indicating that said respective device is in a request state;

E. first gate means, responsive to the simultaneous presence of both said signal indicating that said respective device is in said request state and to a signal indicating that said respective device is the highest priority device in the request state, said last mentioned signal coupled for receipt from said bus means, for providing an interrupt request signal to said processor;

F. second gate means, responsive to the simultaneous presence of an acknowledgement signal from said processor in response to said interrupt request signal and to said signal indicating that said respective device is in the request state and to said signal indicating that said respective device is the highest priority device, for generating an enabling signal; and G. third bistable means, responsive to said enabling signal, for generating a signal indicating that said respective device is in the active state.

9. Apparatus as in claim 8 further comprising means, responsive to a clear signal indicating the completion of the interrupt servicing between said respective device and said processor, for changing the state indicated by said third bistable means so that an inactive state of said respective device is indicated.

10. Apparatus as in claim 9 further comprising:

A. means for coupling the signal indicating that said respective device is in the active state to change the states indicated by said first and second bistable means so that said signal indicating said wait and request state are no longer generated; and B. means for coupling said clear signal to said third bistable means so that said signal indicating said active state is no longer generated.

11. Apparatus as in claim 8 further comprising:

A. means for suspending the interrupt servicing with said respective device in the active state when said interrupt signal is generated by another device having a higher priority than said respective device; and B. means for automatically resuming the interrupt servicing with said respective device whose transfer has been suspended upon the completion of the interrupt servicing between said higher priority device and said processor.

* * * * *